(12) United States Patent
Nishimura et al.

(10) Patent No.: US 10,730,534 B2
(45) Date of Patent: *Aug. 4, 2020

(54) RAILCAR STEERING BOGIE

(71) Applicant: KAWASAKI JUKOGYO KABUSHIKI KAISHA, Kobe-shi, Hyogo (JP)

(72) Inventors: Takehiro Nishimura, Kobe (JP); Yoshi Sato, Sanda (JP); Yukitaka Taga, Kobe (JP); Yousuke Tsumura, Kobe (JP); Keiichiro Kamura, Kobe (JP); Fumikazu Kounoike, Kakogawa (JP); Koichi Murata, Kobe (JP); Francois Olivier Uchida, Kobe (JP); Yuta Yoshimatsu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 229 days.
This patent is subject to a terminal disclaimer.

(21) Appl. No.: 15/772,353

(22) PCT Filed: Oct. 20, 2016

(86) PCT No.: PCT/JP2016/081046
§ 371 (c)(1),
(2) Date: Apr. 30, 2018

(87) PCT Pub. No.: WO2017/073442
PCT Pub. Date: May 4, 2017

(65) Prior Publication Data
US 2018/0327003 A1 Nov. 15, 2018

(30) Foreign Application Priority Data
Oct. 29, 2015 (JP) .................................. 2015-212679

(51) Int. Cl.
*B61F 5/44* (2006.01)
*F16C 11/06* (2006.01)
(Continued)

(52) U.S. Cl.
CPC .................. *B61F 5/44* (2013.01); *B61F 5/06* (2013.01); *B61F 5/10* (2013.01); *B61F 5/142* (2013.01);
(Continued)

(58) Field of Classification Search
CPC ...... B61F 5/44; B61F 5/06; B61F 5/10; B61F 5/142; B61F 5/16; F16C 7/02; F16C 11/06; F16C 11/08
See application file for complete search history.

(56) References Cited

U.S. PATENT DOCUMENTS 3,948,188 A * 4/1976 Zehnder ................. B60G 11/04
  105/167
2005/0116436 A1* 6/2005 Landrot ................... B61F 5/305
  280/124.109
(Continued)

FOREIGN PATENT DOCUMENTS

JP  H06-87446 A  3/1994
JP  H10-264812 A  10/1998

*Primary Examiner* — Jason C Smith
(74) *Attorney, Agent, or Firm* — Oliff PLC

(57) ABSTRACT

A railcar steering bogie includes: a bogie frame supporting a bolster such that the bolster is swingable relative to the bogie frame about a vertical axis; two wheelsets each including an axle and a pair of wheels; and a steering mechanism configured to steer at least one of the two wheelsets in accordance with the swinging of the bolster relative to the bogie frame. The steering mechanism includes: a steering lever configured to turn relative to the bogie frame about a fulcrum axis; a coupling link coupling the bolster and the steering lever and configured to operate in conjunction with the swinging of the bolster relative to the bogie frame; and a steering link coupled to the steering lever and configured to steer the wheelset in conjunction with the turning of the steering lever. The steering link is coupled to the steering lever by a pin member.

5 Claims, 10 Drawing Sheets

(51) Int. Cl.
*F16C 7/02* (2006.01)
*B61F 5/06* (2006.01)
*B61F 5/10* (2006.01)
*B61F 5/14* (2006.01)
*B61F 5/16* (2006.01)

(52) U.S. Cl.
CPC .................. *B61F 5/16* (2013.01); *F16C 7/02* (2013.01); *F16C 11/0604* (2013.01); *F16C 11/0614* (2013.01); *F16C 2326/10* (2013.01)

(56) References Cited

U.S. PATENT DOCUMENTS

| | | | |
|---|---|---|---|
| 2010/0294164 A1* | 11/2010 | Oku | B61D 13/00 |
| | | | 105/182.1 |
| 2014/0137765 A1* | 5/2014 | Nishimura | B61F 3/04 |
| | | | 105/182.1 |
| 2018/0319411 A1* | 11/2018 | Nishimura | B61F 5/325 |
| 2018/0327003 A1* | 11/2018 | Nishimura | F16C 11/0614 |
| 2019/0016354 A1* | 1/2019 | Nishimura | B61H 1/00 |
| 2019/0084596 A1* | 3/2019 | Taga | B61F 5/30 |
| 2019/0291583 A1* | 9/2019 | Sato | F16F 1/38 |
| 2019/0329659 A1* | 10/2019 | Tamura | B61F 5/30 |
| 2019/0375436 A1* | 12/2019 | Tamura | B61F 5/30 |
| 2020/0039541 A1* | 2/2020 | Tamura | B61F 5/301 |

* cited by examiner

RAILCAR STEERING BOGIE

TECHNICAL FIELD

The present invention relates to a railcar steering bogie including a link mechanism.

BACKGROUND ART

As a railcar bogie, there exists a steering bogie capable of changing directions of wheelsets in a yawing direction. Known as one example of such steering bogie is a steering bogie of PTL 1. The steering bogie of PTL 1 includes a link mechanism (Z link), and the Z link includes a vertical link and two horizontal links. The vertical link is attached to a bogie frame so as to be turnable and is coupled to a carbody through a parallel link. Further, the two horizontal links are attached to the vertical link. The two horizontal links extend from the vertical link to one side and the other side in a forward/rearward direction and are attached to respective axle boxes provided at respective wheelsets. When the steering bogie 1 configured as above travels through a curved line, the carbody and the bogie swing relative to each other, and the vertical link turns. With this, the two horizontal links move the axle boxes in such directions that the axle boxes get close to each other or separate from each other. Thus, the directions of the wheelsets in the yawing direction are changed.

CITATION LIST

Patent Literature

PTL 1: Japanese Laid-Open Patent Application Publication No. 6-87446

SUMMARY OF INVENTION

Technical Problem

The steering bogie of PTL1 is configured such that each horizontal link and the vertical link turn relative to each other by a pin member. On this account, the pin member repeats relative turning in accordance with, for example, shakes of the steering bogie, and therefore, the pin member is worn away in some cases. Since the pin member is worn away, backlash is generated between the pin member and the vertical link and between the pin member and the horizontal link, and this deteriorates responsiveness of the turning of the link mechanism and the wheelsets with respect to the relative swinging of the carbody, i.e., this deteriorates steering responsiveness.

An object of the present invention is to provide a steering bogie capable of suppressing deterioration of steering responsiveness.

Solution to Problem

A railcar steering bogie of the present invention includes: a bogie frame supporting a carbody or a bolster such that the carbody or the bolster is swingable relative to the bogie frame about a vertical axis; two wheelsets each including an axle and a pair of wheels; and a steering mechanism configured to steer at least one of the two wheelsets in accordance with the swinging of the carbody or the bolster relative to the bogie frame, the steering mechanism including a steering lever configured to turn relative to the bogie frame about a fulcrum axis, a coupling link coupling the steering lever and the carbody or the bolster and configured to operate in conjunction with the swinging of the carbody or the bolster relative to the bogie frame, and a steering link coupled to the steering lever and configured to steer the wheelset in conjunction with the turning of the steering lever, the steering link being coupled to the steering lever by a pin member, the pin member being fixed to the steering lever so as not to be turnable relative to the steering lever.

According to the present invention, it is possible to prevent a case where the pin member turns relative to the steering lever by shakes during traveling, and therefore, the pin member or the steering lever is worn away. With this, it is possible to prevent a case where backlash is generated between the pin member and the steering lever, and this deteriorates steering responsiveness.

Advantageous Effects of Invention

According to the present invention, the deterioration of the steering responsiveness can be suppressed.

The above object, other objects, features, and advantages of the present invention will be made clear by the following detailed explanation of preferred embodiments with reference to the attached drawings.

BRIEF DESCRIPTION OF DRAWINGS

FIG. 8A shows a state where wheels of the steering bogie travel through a straight section of a rail. FIG. 8B shows a state where the wheels of the steering bogie travel on an outer rail in the curved section of the rail. FIG. 8C shows a state where the wheels of the steering bogie travel on an inner rail in the curved section of the rail.

DESCRIPTION OF EMBODIMENTS

Hereinafter, railcar steering bogies (hereinafter simply referred to as "steering bogies") 1 and 1A of Embodiments 1 and 2 according to the present invention will be explained in reference to the drawings. It should be noted that directions stated in the following explanations are used for convenience of explanation, and directions and the like of components of the present invention are not limited. Further, each of steering bogies 1, 1A, and 1B of respective embodiments explained below is just one embodiment of the present invention. Therefore, the present invention is not limited to the embodiments, and additions, deletions, and modifications may be made within the scope of the present invention.

Embodiment 1

Figure 1:
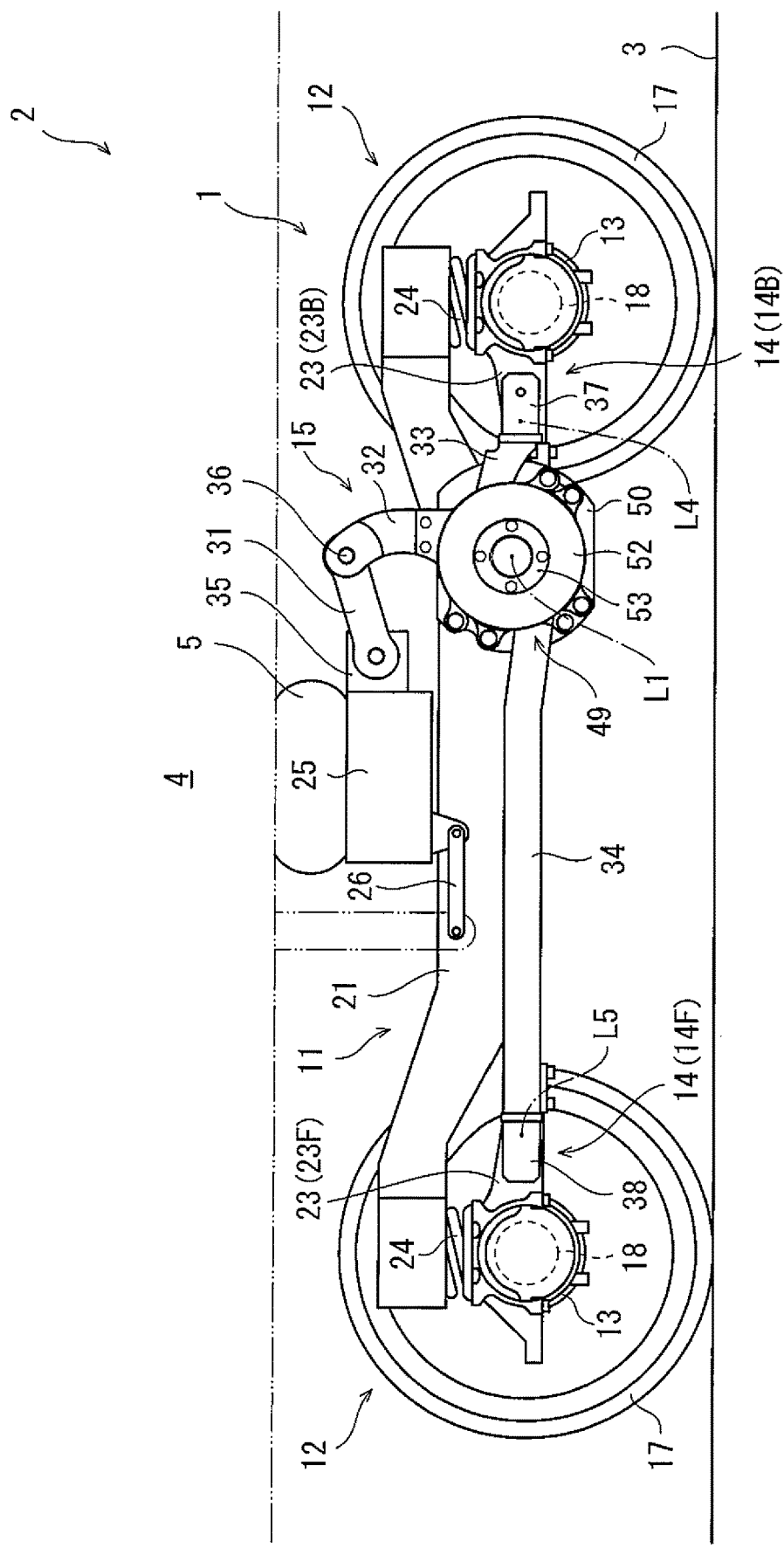
FIG. 1 is a side view when viewing a railcar steering bogie of Embodiment 1 from a lateral side.

A railcar 2 shown in FIG. 1 travels on a rail 3 laid on a ground surface or the like and includes a carbody 4 and a steering bogie 1. The carbody 4 is formed in a substantially box shape that is long in a direction along the rail. The carbody 4 accommodates passengers, cargo, and/or the like. The steering bogie 1 is arranged under the carbody 4 and supports the carbody 4 through an air spring 5. Hereinafter, the configuration of the steering bogie 1 will be explained in detail.

Steering Bogie

Figure 2:
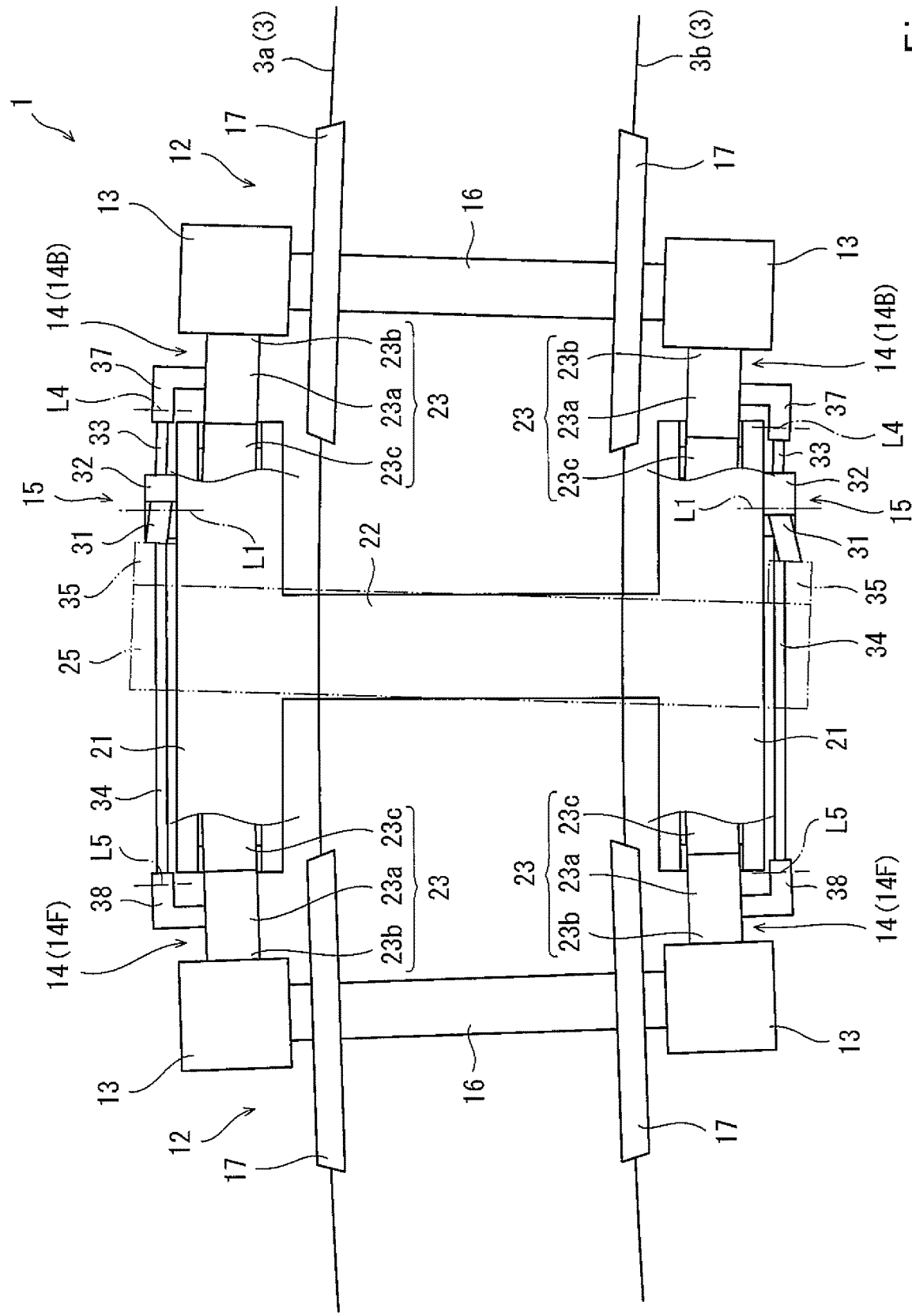
FIG. 2 is a plan view when viewing, from a vehicle upper side, a state where the steering bogie of FIG. 1 travels through a curved section.

As shown in FIGS. 1 and 2, the steering bogie 1 includes a bogie frame 11 and a pair of front and rear wheelsets 12. The bogie frame 11 includes a pair of side sills 21 and a cross beam 22. The pair of side sills 21 are members extending in a longitudinal direction of the carbody 4 (i.e., a car longitudinal direction; hereinafter referred to as a "longitudinal direction"). The pair of side sills 21 are arranged so as to be parallel to each other and spaced apart from each other in a car width direction of the carbody 4 (hereinafter may be referred to as a "car width direction"). The cross beam 22 is provided so as to extend between middle portions of the pair of side sills 21 and be integrated with the pair of side sills 21. The bogie frame 11 is formed in an H shape in a plan view (see FIG. 2). The pair of wheelsets 12 are arranged at the bogie frame 11 configured as above so as to be spaced apart from each other in the longitudinal direction and parallel to each other.

As shown in FIG. 2, each of the wheelsets 12 includes an axle 16 and a pair of wheels 17. The axle 16 is a rod-shaped member extending in the car width direction. The pair of wheels 17 are integrally provided at the axle 16 so as to be spaced apart from each other in an axial direction of the axle 16. To attach the wheelsets 12 to the bogie frame 11, the steering bogie 1 includes, for each wheelset 12, a pair of axle boxes 13 and a pair of axle box suspensions 14.

The pair of axle boxes 13 are provided at both respective axial direction side portions of the axle 16 of the wheelset 12. The axle boxes 13 accommodate respective bearings 18, such as journal bearings, and the bearings 18 support both respective axial direction side portions of the axle 16 such that the axle 16 is rotatable. Further, the axle box suspensions 14 are provided at the respective axle boxes 13, and the axle boxes 13 are coupled to the bogie frame 11 through the respective axle box suspensions 14 (also see FIG. 1).

Each of the axle box suspensions 14 is, for example, an axle beam type axle box suspension and includes an axle beam 23 and an axle spring 24 (also see FIG. 1). The axle beam 23 includes an axle beam main body portion 23a extending in the longitudinal direction, and a base end portion 23b of the axle beam main body portion 23a is coupled to the axle box 13. The axle spring 24 is provided at an upper end portion of the axle box 13. The axle spring 24 is interposed between the axle box 13 and a portion of the side sill 21 of the bogie frame 11, the portion being located right above the axle box 13. With this, the axle box 13 supported by the axle beam 23 supports the side sill 21 through the axle spring 24. An axle beam tip end portion 23c is provided at a tip end of the axle beam main body portion 23a. The axle beam tip end portion 23c extends from the axle beam main body portion 23a in the longitudinal direction and is coupled to the bogie frame 11 so as to be pivotable in a car upward/downward direction and the car width direction.

The steering bogie 1 configured as above is a bogie with a bolster and includes a bolster beam 25. The bolster beam 25 is provided at the cross beam 22 through a support shaft (not shown) and turns relative to the cross beam 22 about a vertical axis. Further, the bolster beam 25 supports the carbody 4 through the air spring 5 and is coupled to the carbody 4 by a bolster anchor 26. Therefore, the bolster beam 25 swings integrally with the carbody 4. The steering bogie 1 includes a pair of steering mechanisms 15 configured to steer the pair of wheelsets 12 (i.e., to cause the pair of wheelsets 12 to turn in a yawing direction) in accordance with the swing operation of the bolster beam 25.

Steering Mechanism

Figure 3:
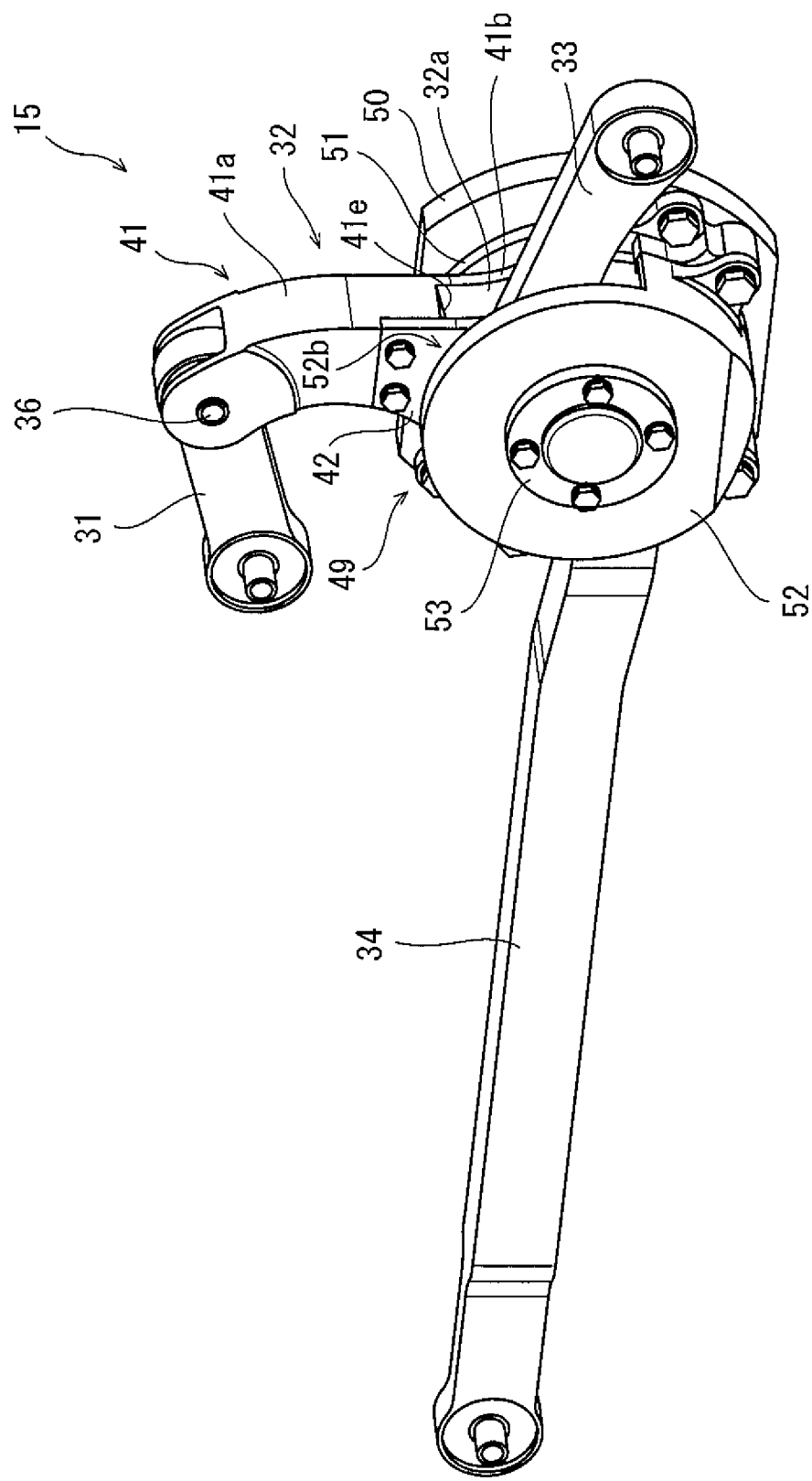
FIG. 3 is a perspective view when viewing a steering mechanism included in the steering bogie of FIG. 1 from a rear side.
Figure 4:
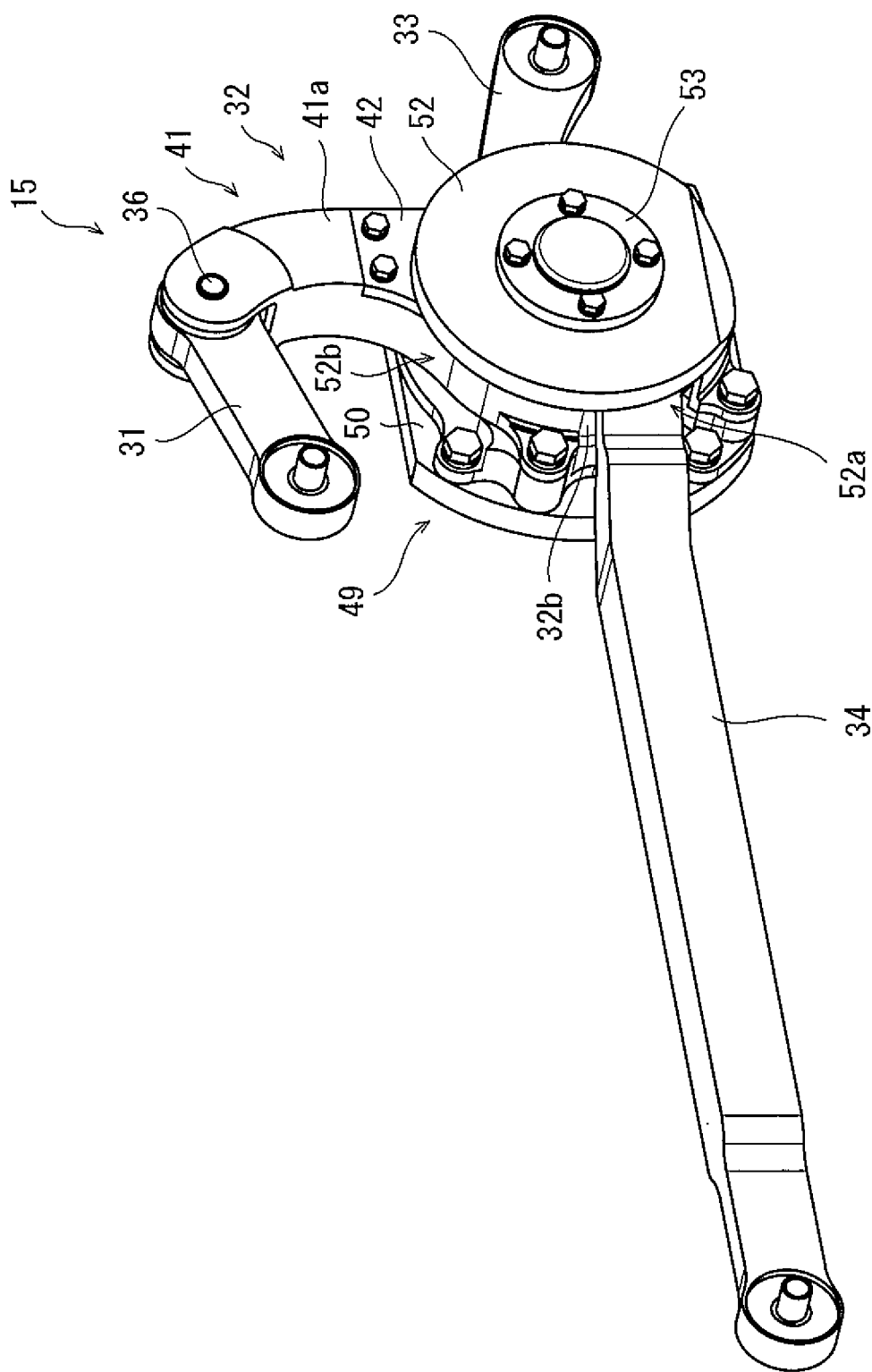
FIG. 4 is a perspective view when viewing the steering mechanism included in the steering bogie of FIG. 1 from a front side.

As shown in FIG. 2, the steering mechanisms 15 are arranged at the respective side sills 21 of the bogie frame 11. The steering mechanisms 15 are arranged mirror-symmetrically about a carbody center line. It should be noted that FIG. 2 shows the steering bogie 1 in which both longitudinal direction end portions of each of the pair of side sills 21 are cut. The pair of steering mechanisms 15 are the same in configuration as each other. As shown in FIGS. 3 and 4, each of the steering mechanisms 15 includes a coupling link 31, a steering lever 32, a first steering link 33, and a second steering link 34. The coupling link 31 is a member extending substantially in the longitudinal direction. As shown in FIG. 1, one longitudinal direction end portion of the coupling link 31 is coupled to the bolster beam 25 through a bolster beam-side link receiving member 35. Further, the longitudinal direction end portion of the coupling link 31 is attached to the bolster beam-side link receiving member 35 so as to be relatively turnable in the car upward/downward direction and moves in the longitudinal direction in conjunction with the relative swing operations of the bolster beam 25 and the cross beam 22 of the bogie frame 11. The other longitudinal direction end portion of the coupling link 31 is coupled to the steering lever 32.

Figure 5:
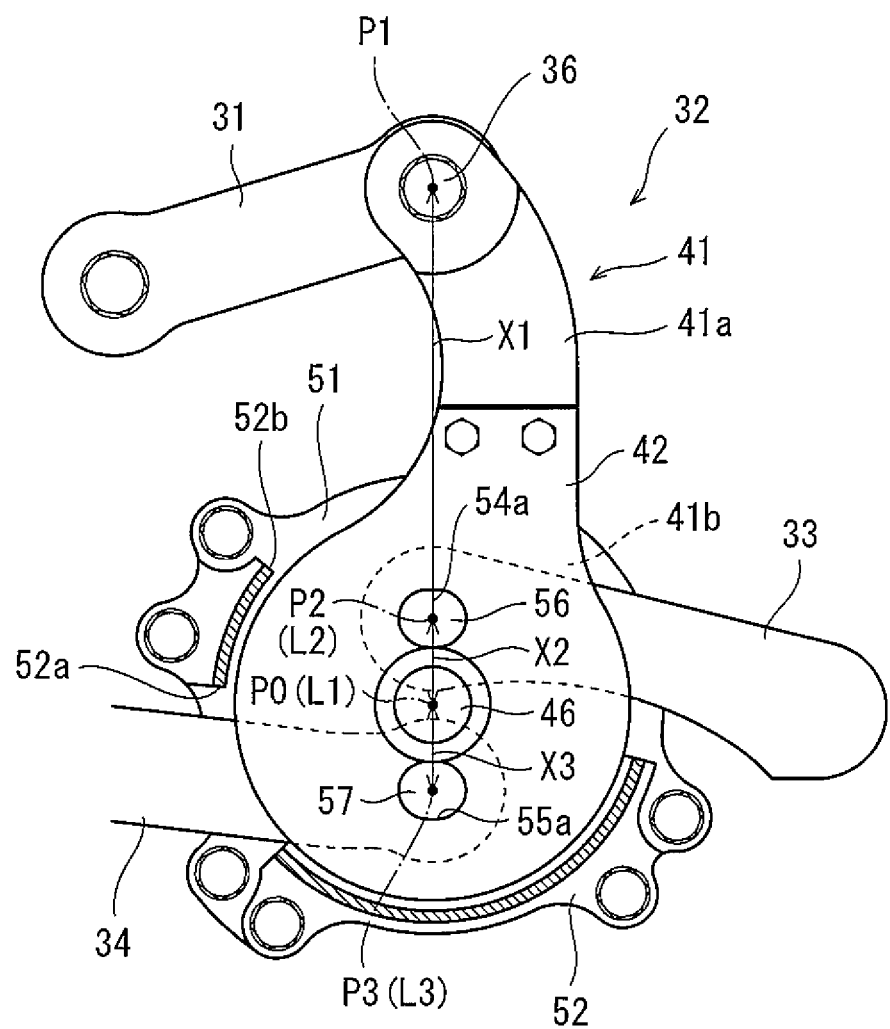
FIG. 5 is a side sectional view when viewing a part of the steering mechanism of FIG. 4 from a lateral side.
Figure 6:
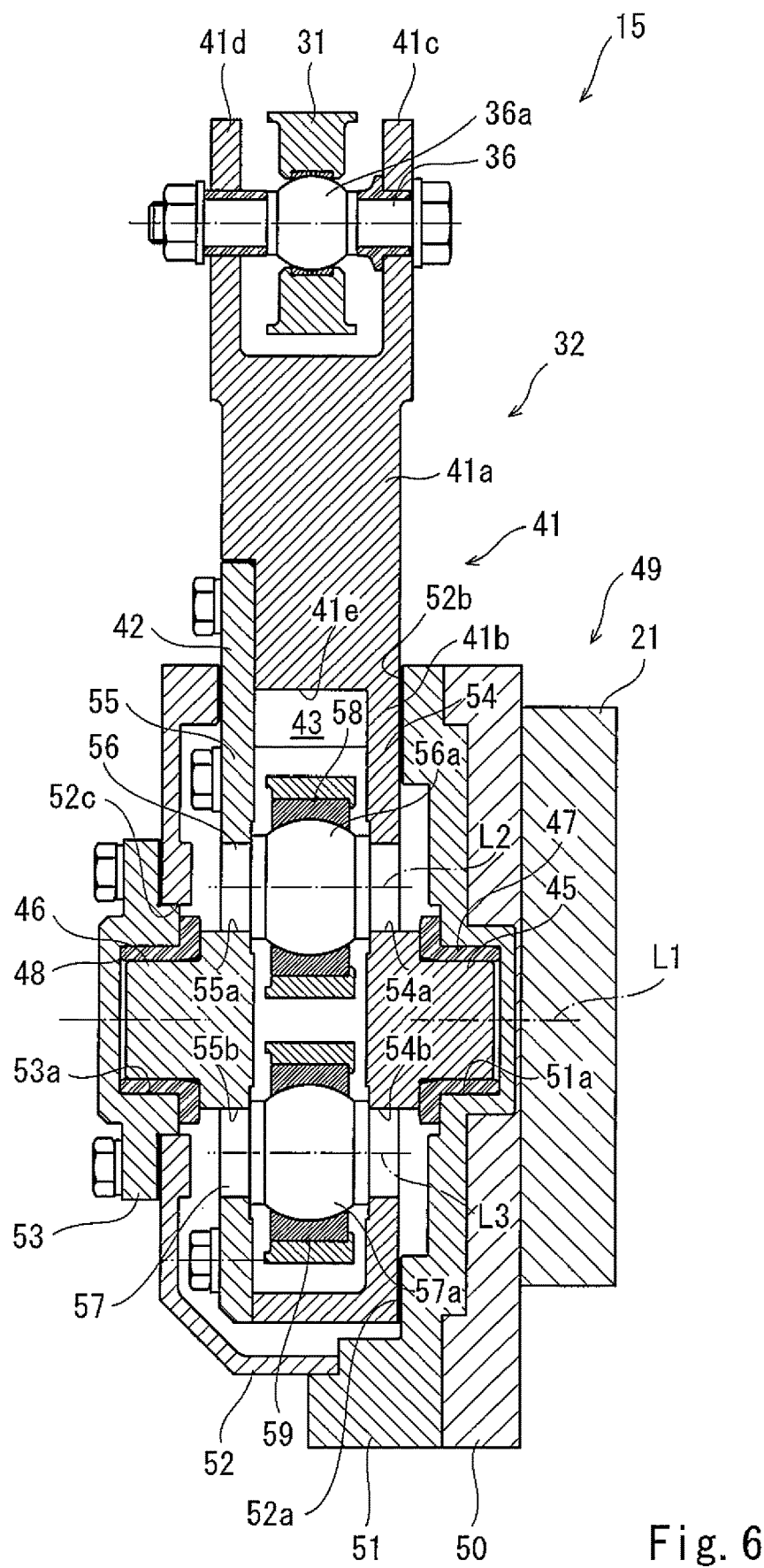
FIG. 6 is a rear sectional view when viewing the steering mechanism of FIG. 4 from a rear side.

As shown in FIG. 5, the steering lever 32 is a plate-shaped member having a comma shape (i.e., an inverted comma shape) in a side view and turns about a fulcrum axis L1. It should be noted that in FIG. 5, a below-described housing 49 is cut such that the steering lever 32 becomes visible. The steering lever 32 includes a lever main body 41 and a lid body 42, and the lever main body 41 is formed in a comma shape in a side view. A curved portion 41a constituting an upper portion of the lever main body 41 extends in the car upward/downward direction and is curved so as to be concave toward a first side in the longitudinal direction. Further, an upper portion of the curved portion 41a is divided into two parts as shown in FIG. 6. A shaft member 36 extends between portions 41c and 41d that are the two parts of the curved portion 41a. The shaft member 36 includes a spherical bushing 36a at an intermediate portion thereof, and the spherical bushing 36a is inserted into the coupling link 31. With this, the coupling link 31 and the steering lever 32 are coupled to each other, and the coupling link 31 turns relative to the steering lever 32 in the car upward/downward direction and the car width direction.

An accommodating portion 41b constituting a lower portion of the lever main body 41 has a circular shape in a side view as shown in FIG. 5. As shown in FIG. 6, a concave portion 41e that is open toward both sides in the longitudinal direction is formed about a center axis (fulcrum axis L1) of the accommodating portion 41b. The lid body 42 is provided at the accommodating portion 41b so as to cover the concave portion 41e. By covering the concave portion 41e with the lid body 42, an accommodating space 43 is formed in the steering lever 32. A pair of shaft portions 45 and 46 serving as a turning shaft of the steering lever 32 are formed at a back surface of the accommodating portion 41b and a front surface of the lid body 42, respectively. Each of the pair of shaft portions 45 and 46 is formed in a substantially columnar shape and extends along the center axis of the accommodating portion 41b, i.e., the fulcrum axis L1. The pair of shaft portions 45 and 46 formed as above are arranged so as to be spaced apart from each other in an axial direction along which the fulcrum axis L1 extends. Cylindrical thrust bushings 47 and 48 are externally attached to the respective shaft portions 45 and 46. The shaft portions 45 and 46 are attached to the housing 49 through the respective thrust bushings 47 and 48.

The housing 49 accommodates at least a part of the steering lever 32, specifically the accommodating portion 41b and the lid body 42. The housing 49 includes a housing seat 50, a rear box 51, a front box 52, and a box lid 53. The housing seat 50 is a plate-shaped member having a substantially rounded-corner circular shape extending in the longitudinal direction in a side view. A back surface of the housing seat 50 is fixed to an outer surface of the side sill 21 of the bogie frame 11. Further, the rear box 51 is fixed to a front surface of the housing seat 50 by a fastening member, such as a bolt. The rear box 51 is formed in a substantially circular shape in a side view, and a bearing hole 51a is formed about a center of the rear box 51. The shaft portion 45 of the accommodating portion 41b is fitted in the bearing hole 51a through the thrust bushing 47. The shaft portion 45 turns relative to the rear box 51. Further, the front box 52 is provided at the rear box 51.

The front box 52 is a box-shaped body having a substantially annular shape in a side view. The front box 52 is provided at the rear box 51 so as to cover the accommodating portion 41b and the lid body 42 and is fixed to the rear box 51 by a fastening member, such as a bolt. An opening 52a is formed at a part of a lower portion of one of both longitudinal direction-side surfaces of the front box 52, and an opening 52b is formed at an entire upper portion of the other longitudinal direction surface of the front box 52. The below-described second steering link 34 projects from the opening 52a located at a second side in the longitudinal direction. The curved portion 41a projects upward from the opening 52b located at the first side in the longitudinal direction, and the below-described first steering link 33 projects from the opening 52b toward the first side in the longitudinal direction. Further, an inner hole 52c is formed about a center axis of the front box 52 (i.e., the fulcrum axis L1) and has a hole diameter larger than each of an outer diameter of the shaft portion 46 of the lid body 42 and an outer diameter of the thrust bushing 48. The shaft portion 46 and the thrust bushing 48 project from the inner hole 52c. The box lid 53 is provided at the front box 52 so as to close the inner hole 52c and is fixed to the front box 52 by a fastening member, such as a bolt. As shown in FIG. 1, the box lid 53 is formed in a substantially circular shape in a side view, and a bearing hole 53a is formed about a center axis of the box lid 53 (i.e., the fulcrum axis L1). The shaft portion 46 of the lid body 42 is fitted in the bearing hole 53a through the thrust bushing 48. With this, the shaft portion 46 turns relative to the box lid 53.

As above, in the steering lever 32, the pair of shaft portions 45 and 46 are turnably fitted in the housing 49 (specifically, the rear box 51 and the box lid 53, respectively), fixed to the side sill 21, through the respective thrust bushings 47 and 48. With this, the steering lever 32 can turn relative to the bogie frame 11 about the pair of shaft portions 45 and 46, i.e., about the fulcrum axis L1. As above, since the steering lever 32 is supported at two points that are the pair of shaft portions 45 and 46, backlash of the steering lever 32 can be made smaller than a case where the steering lever 32 is supported at one point. In the steering lever 32 having such function, a part of the lid body 42 and a part of the accommodating portion 41b constitute a pair of plate portions 54 and 55 sandwiching the accommodating space 43 and opposing each other. Two pin members 56 and 57 are provided at the pair of plate portions 54 and 55 so as to extend between the pair of plate portions 54 and 55.

Each of the first pin member 56 serving as a turning shaft of the first steering link 33 and the second pin member 57 serving as a turning shaft of the second steering link 34 is a substantially columnar shaft member extending in the car width direction (axial direction). Two fitting holes 54a and 54b are formed at the plate portion 54 so as to sandwich the fulcrum axis L1 and be spaced apart from each other, and two fitting holes 55a and 55b are formed at the plate portion 55 so as to sandwich the fulcrum axis L1 and be spaced apart from each other. The fitting holes 54a and 54b of the plate portion 54 oppose the fitting holes 55a and 55b of the other plate portion 55, respectively. Both end portions of the first pin member 56 are fitted in the respective opposing fitting holes 54a and 55a so as not to be turnable, and both end portions of the second pin member 57 are fitted in the respective opposing fitting holes 54b and 55b so as not to be turnable. Hereinafter, the shapes of the first pin member 56, the second pin member 57, and the like will be explained in further detail.

Figure 7:
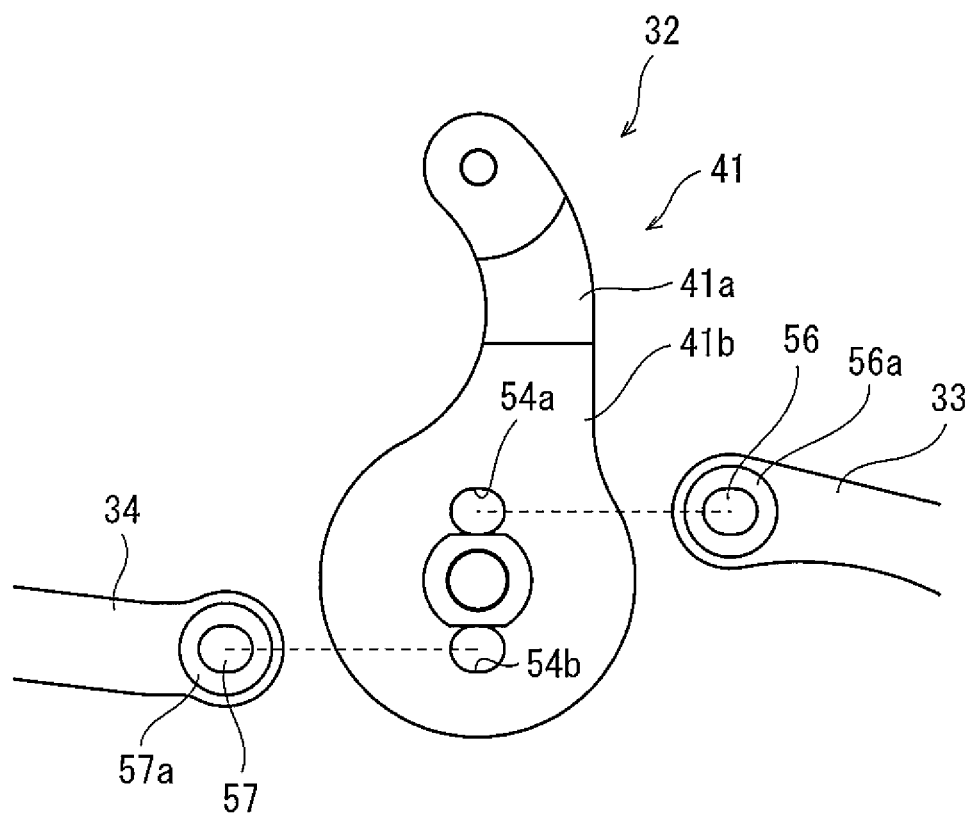
FIG. 7 is an exploded view showing a steering lever and steering links of the steering mechanism of FIG. 4.

As shown in FIG. 7, each of both end portions of the pin member 56 and both end portions of the pin member 57 has a substantially rounded-corner rectangular shape in a side view. The fitting hole 54a (54b) is formed such that one end portion of the pin member 56 (57) is fitted therein. The fitting hole 54a (54b) is formed in the same shape as the end portion of the pin member 56 (57) in a side view. The fitting hole 55a (55b) is formed such that the other end portion of the pin member 56 (57) is fitted therein. The fitting hole 55a (55b) is formed in the same shape as the other end portion of the pin member 56 (57) in a side view. With this, by fitting the end portions of the pin members 56 and 57 in the fitting holes 54a, 54b, 55a, and 55b, the pin members 56 and 57 are provided at the steering lever 32 so as not to be turnable relative to the steering lever 32.

Each of the shapes of the end portions of the pin members 56 and 57 and the fitting holes 54a, 54b, 55a, and 55b is not limited to the substantially rounded-corner rectangular shape in a side view and may be a substantially oval shape, an egg shape, or a substantially circular shape including a key or a keyway. To be specific, each of the shapes of the end portions of the pin members 56 and 57 is only required to be formed such that a major axis of each of the end portions of the pin members 56 and 57 is longer than a minor axis of each of the fitting holes 54a, 54b, 55a, and 55b. With this, the pin member 56 and 57 are configured so as not to be turnable relative to the pair of plate portions 54 and 55. Further, spherical bushings 56a and 57a are provided at respective car width direction intermediate portions of the pin members 56 and 57. Self-lubrication rubber members 58 and 59 formed by a rubber material having lubricity are externally attached to respective outer surfaces of the spherical bushings 56a and 57a, or the outer surfaces of the spherical bushings 56a and 57a are coated with the respective self-lubrication rubber members 58 and 59.

The two pin members 56 and 57 configured as above are arranged so as to sandwich the fulcrum axis L1 in a side view and be spaced apart from each other in the car upward/downward direction. The steering link 33 is provided at the spherical bushing 56a of the pin member 56 through the self-lubrication rubber member 58, and the steering link 34 is provided at the spherical bushing 57a of the pin member 57 through the self-lubrication rubber member 59. The steering links 33 and 34 are coupled to the steering lever 32 through the pin members 56 and 57.

The first steering link 33 is a member extending in the longitudinal direction. The spherical bushing 56a of the first pin member 56 to which the self-lubrication rubber member 58 is externally attached is inserted into one longitudinal direction end portion of the first steering link 33. Thus, the first steering link 33 is coupled to the steering lever 32. Since the spherical bushing 56a has a partially spherical shape, the first steering link 33 swivels about a center point of the spherical bushing 56a. As above, the first steering link 33 is arranged between the pair of plate portions 54 and 55 of the steering lever 32. Thus, the first steering link 33 can turn about an action axis L2 that is a center axis of the first pin member 56 and also pivot in the car width direction.

Similarly, the second steering link 34 is a member extending in the longitudinal direction. The spherical bushing 57a of the second pin member 57 to which the self-lubrication rubber member 59 is externally attached is inserted into one longitudinal direction end portion of the second steering link 34. Since the spherical bushing 57a has a partially spherical shape, the second steering link 34 swivels about a center point of the spherical bushing 57a. As above, the second steering link 34 is arranged between the pair of plate portions 54 and 55. Thus, the second steering link 34 can turn about an action axis L3 that is a center axis of the second pin member 57 and also pivot in the car width direction.

As above, one end portion of the first steering link 33 and one end portion of the second steering link 34 are coupled to the steering lever 32 through the respective pin members 56 and 57 and are arranged so as to be spaced apart from each other in the car upward/downward direction. Further, by arranging the two pin members 56 and 57 in the accommodating space 43, the end portion of the first steering link 33 and the end portion of the second steering link 34 are accommodated in the accommodating space 43. The accommodating space 43 communicates with an outside through openings 32a and 32b formed at both respective longitudinal direction-side surfaces of the accommodating portion 41b. The opening 32a is formed at an obliquely upper portion of a surface of the accommodating space 43 which surface is located at the first side in the longitudinal direction, and the first steering link 33 projects from the opening 32a. The projecting first steering link 33 further extends through the opening 52a toward the first side in the longitudinal direction. The opening 32b is formed at an obliquely lower portion of a surface of the accommodating space 43 which surface is located at the second side in the longitudinal direction, and the second steering link 34 projects from the opening 32b. The projecting second steering link 34 further extends through the opening 52a toward the second side in the longitudinal direction. As above, the steering link 33 extends toward the first side in the longitudinal direction, and the steering link 34 extends toward the second side in the longitudinal direction. As shown in FIG. 2, the other end portion of the first steering link 33 is coupled through a first axle beam-side link receiving member 37 to an axle beam 23B located at the first side in the longitudinal direction, and the other end portion of the second steering link 34 is coupled through a second axle beam-side link receiving member 38 to an axle beam 23F located at the second side in the longitudinal direction.

As shown in FIG. 2, the first axle beam-side link receiving member 37 is formed in a substantially L shape in a plan view. A base end portion of the first axle beam-side link receiving member 37 extends from the axle beam main body portion 23a of the axle beam 23B located at the first side in the longitudinal direction, and one end portion of the first axle beam-side link receiving member 37 is coupled to the first steering link 33. Therefore, the first steering link 33 is arranged offset outside the axle beam tip end portion 23c in the car width direction by the first axle beam-side link receiving member 37. The first steering link 33 arranged as above can turn in the car width direction relative to the first axle beam-side link receiving member 37 about a turning axis L4 extending in the car width direction (also see FIG. 1).

Further, the second axle beam-side link receiving member 38 is formed in a substantially L shape in a plan view. A base end portion of the second axle beam-side link receiving member 38 is fixed to the axle beam main body portion 23a of the axle beam 23F located at the second side in the longitudinal direction, and one end portion of the second axle beam-side link receiving member 38 is coupled to the second steering link 34. Therefore, the second steering link 34 is arranged offset outside the axle beam 23F in the car width direction by the second axle beam-side link receiving member 38. The second steering link 34 arranged as above can turn in the car width direction relative to the second axle beam-side link receiving member 38 about a turning axis L5 extending in the car width direction (also see FIG. 1).

Figure 8:
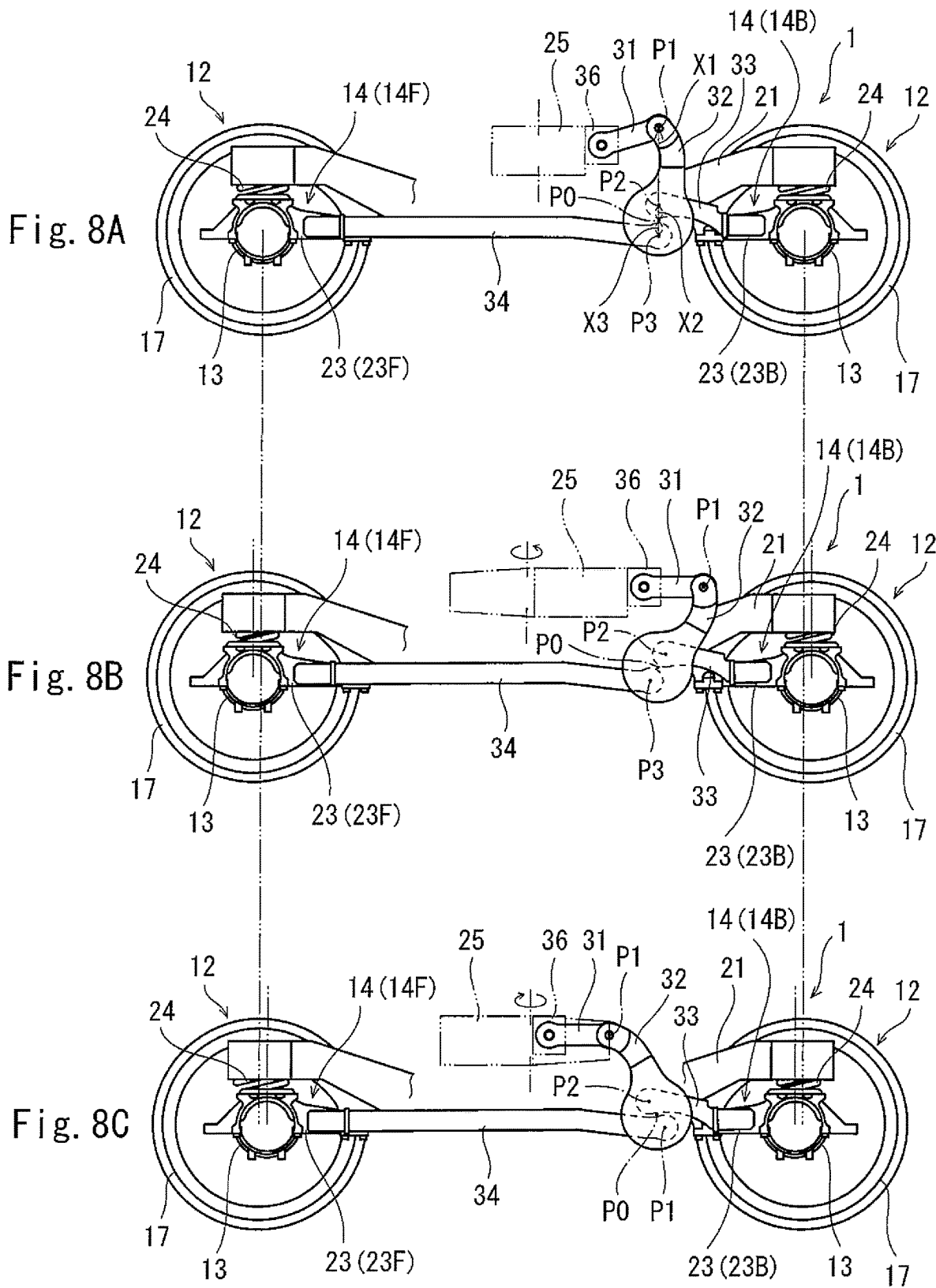
FIGS. 8A to 8C are side views showing steering operations of the steering bogie of FIG. 1.

The steering mechanisms 15 configured as above are arranged outside the respective side sills 21 of the bogie frame 11 in a posture shown in FIG. 8A. With this, the steering lever 32 is attached to the bogie frame 11 such that the fulcrum axis L1 thereof extends in the car width direction. In addition, the steering lever 32 is arranged in such a posture that a coupling point P1 that is a turning center of the coupling link 31, a fulcrum P0 that is a turning center of the steering lever 32, and action points P2 and P3 that are respective turning centers of the two steering links 33 and 34 are aligned on the same straight line in the car upward/downward direction.

Operations of Steering Mechanisms

When the bolster beam 25 and the bogie frame 11 swing relative to each other in a curved section, the steering mechanism 15 operates in conjunction with this swing operation. To be specific, as shown in FIGS. 8B and 8C, when the bolster beam 25 and the cross beam 22 of the bogie frame 11 swing relative to each other, the coupling link 31 moves toward the first side (or the second side) in the longitudinal direction in conjunction with the swing operation. With this, the curved portion 41a of the steering lever 32 is pushed toward the first side (or pulled toward the second side) in the longitudinal direction, and thus, the steering lever 32 turns clockwise (or counterclockwise) about the fulcrum P0 (i.e., the fulcrum axis L1). The two pin members 56 and 57 also turn clockwise (or counterclockwise) about the fulcrum P0 together with the steering lever 32. By this turning operations, the two pin members 56 and 57 move in different directions along the longitudinal direction in a plan view. In accordance with this, the first steering link 33 and the second steering link 34 move in different directions along the longitudinal direction.

For example, as shown in FIG. 8B, when the bolster beam 25 swings relative to the cross beam 22 toward a first side in a swing direction, and with this, the coupling link 31 moves toward the first side in the longitudinal direction, the first steering link 33 and the second steering link 34 move in such directions as to separate from each other. In this case, the axle beam 23B (see FIG. 2) located at the first side in the longitudinal direction is pushed by the first steering link 33 toward the first side in the longitudinal direction, and the axle beam 23F located at the second side in the longitudinal direction is pushed by the second steering link 34 through the second axle beam-side link receiving member 38 toward the second side in the longitudinal direction. With this, the axle box 13 supported by an axle box suspension 14B and the axle box 13 supported by an axle box suspension 14F move so as to separate from each other.

On the other hand, as shown in FIG. 8C, when the bolster beam 25 swings relative to the cross beam 22 toward a second side in the swing direction, and with this, the coupling link 31 moves toward the second side in the longitudinal direction, the first steering link 33 and the second steering link 34 move in such directions as to get close to each other. In this case, the axle beam 23B located at the first side in the longitudinal direction is pulled by the first steering link 33 toward the second side in the longitudinal direction, and the axle beam 23F located at the second side in the longitudinal direction is pulled by the second steering link 34 toward the first side in the longitudinal direction. With this, the axle box 13 supported by the axle box suspension 14B and the axle box 13 supported by the axle box suspension 14F move so as to get close to each other.

The steering mechanisms 15 configured as above are mirror-symmetrically arranged outside the respective side sills 21 in the car width direction. When the bolster beam 25 and the bogie frame 11 swing relative to each other, the steering links 33 and 34 of one of the steering mechanisms 15 and the steering links 33 and 34 of the other steering mechanism 35 move in opposite directions. To be specific, when the steering bogie 1 travels through the curved section, and the bolster beam 25 and the bogie frame 11 swing relative to each other toward the first side in the swing direction, as shown in FIG. 2, the steering mechanism 15 close to an outer rail 3a turns the steering lever 32, and with this, moves the first steering link 33 and the second steering link 34 such that the first steering link 33 and the second steering link 34 separate from each other. Thus, the two axle boxes 13 close to the outer rail 3a move so as to separate from each other. On the other hand, the steering mechanism 15 close to an inner rail 3b turns the steering lever 32, and with this, moves the first steering link 33 and the second steering link 34 such that the first steering link 33 and the second steering link 34 get close to each other. Thus, the two axle boxes 13 close to the inner rail 3b move so as to get close to each other. As above, the two axle boxes 13 close to the outer rail 3a separate from each other, and the two axle boxes 13 close to the inner rail 3b get close to each other. With this, attack angles of the front and rear wheelsets 12 are reduced, and therefore, the steering bogie 1 smoothly travels through the curved section. As above, the steering mechanisms 15 can steer the pair of wheelsets 12 in accordance with the curved shape of the rail 3.

Further, when the steering bogie 1 travels from the curved section to a straight section, the steering bogie 1 returns to an original posture such that the bolster beam 25 and the cross beam 22 become parallel to each other. In accordance with this, the pair of steering mechanisms 15 perform opposite operations to the above-described operations. To be specific, the steering mechanism 15 close to the outer rail 3a moves the first steering link 33 and the second steering link 34 such that the first steering link 33 and the second steering link 34 get close to each other to be returned to original positions. The steering mechanism 15 close to the inner rail 3b moves the first steering link 33 and the second steering link 34 such that the first steering link 33 and the second steering link 34 separate from each other to be returned to original positions. With this, the coupling point P1, the fulcrum P0, and the action points P2 and P3 are aligned on the same straight line in the car upward/downward direction, and the pair of front and rear wheelsets 12 are straightened. Therefore, a straight advancing property of the steering bogie 1 in the straight section of the rail 3 can be prevented from deteriorating.

In the steering bogie 1 configured as above, the steering links 33 and 34 are arranged between the pair of shaft portions 45 and 46 which serve as a turning center about which the steering lever 32 turns. To be specific, the pair of shaft portions 45 and 46 are arranged at positions offset with respect to the steering links 33 and 34 in the car width direction. With this, restrictions on the arrangement positions of the steering links 33 and 34 in the car upward/downward direction can be reduced. To be specific, the degree of freedom of the design regarding the arrangement positions of the steering links 33 and 34 can be increased. Therefore, the pair of shaft portions 45 and 46 and the steering links 33 and 34 can be arranged so as to overlap one another in a side view.

Further, since the pair of shaft portions 45 and 46 and the steering links 33 and 34 are arranged so as to overlap one another in a side view, a distance X2 between the fulcrum P0 and the action point P2 of the link 33 and a distance X3 between the fulcrum P0 and the action point P3 of the link 34 can be reduced. In the steering bogie 1, to steer the pair of wheelsets 12 at a turning angle corresponding to a ratio predetermined in accordance with a relative swinging angle, a lever ratio (a ratio of the distance X2 to a distance X1 between the fulcrum P and the coupling point P1 or a ratio of the distance X3 to the distance X1 (X2:X1 or X3:X1)) is set to a predetermined ratio, such as 1:6 to 1:7. Therefore, the distance X1 and an external dimension of the steering lever 32 are uniquely determined in accordance with the distances X2 and X3. Since the distances X2 and X3 can be made short in the steering mechanism 15, the external dimension of the steering lever 32 can be made small (especially, the height of the steering lever 32 can be suppressed). With this, the height of the steering mechanism 15 can be made low, and the height of the steering bogie 1 can be made low. Therefore, the steering bogie 1 as a low-floor bogie can be realized. Further, the steering mechanism 15 is formed by stacking plate-shaped members in a direction in which the fulcrum axis L1 extends, and a thickness of the steering mechanism 15 in the car width direction is smaller than the height of the steering mechanism 15. Therefore, by attaching the steering mechanism 15 to the bogie frame 11 such that the fulcrum axis L1 extends in the width direction, the amount of projection of the steering mechanism 15 projecting from the bogie frame 11 in the car width direction can be suppressed, and a length of the steering bogie 1 in the car width direction, i.e., the width of the steering bogie 1 can be suppressed.

As shown in FIG. 2, the steering bogie 1 is configured to allow the axle box suspensions 14B and 14F to incline relative to the bogie frame 11 in the car width direction. Since the steering link 33 (34) swivels on the spherical bushing 56a (57a) of the inserted pin member 56 (57), the steering link 33 (34) is also allowed to incline relative to the axle beam-side link receiving member 37 (38) in the car width direction. To be specific, the axle box suspensions 14B and 14F and the steering links 33 and 34 are allowed to incline relative to the bogie frame 11 in the car width direction. Therefore, the axle boxes 13 can move in the car width direction, and the pair of wheelsets 12 are allowed to move in the yawing direction. Further, since the self-lubrication rubber member 58 is interposed between the spherical bushing 56a and the steering link 33, and the self-lubrication rubber member 59 is interposed between the spherical bushing 57a and the steering link 34, the steering links 33 and 34 can smoothly move relative to the pin members 56 and 57.

Further, in the steering bogie 1, the pin members 56 and 57 are fixed to the steering lever 32 so as not to be turnable relative to the steering lever 32. Therefore, it is possible to prevent a case where while the steering bogie 1 is traveling, the pin members 56 and 57 turn relative to the steering lever 32 to be worn away. With this, it is possible to prevent a case where backlash is generated between the steering lever 32 and each pin member 56, 57, and this deteriorates steering responsiveness or steering performance. Further, in the steering bogie 1, each of the end portions of the pin members 56 and 57 of the steering lever 32 and the fitting holes 54a, 54b, 55a, and 55b is formed in a substantially rounded-corner rectangular shape in a side view, and the end portions of the pin members 56 and 57 are fitted in the fitting holes 54a, 54b, 55a, and 55b. With this, the pin members 56 and 57 can be fixed to the steering lever 32 so as not to be turnable relative to the steering lever 32. Therefore, as compared to a case where the pin members 56 and 57 are fixed by a different member, such as a key, so as not to be relatively turnable, assembly workability can be facilitated, and the number of parts can be reduced.

Embodiment 2

The steering bogie 1A of Embodiment 2 is similar in configuration to the steering bogie 1 of Embodiment 1. Hereinafter, different components of the steering bogie 1A of Embodiment 2 from the steering bogie 1 of Embodiment 1 will be mainly explained. The same reference signs are used for the same components as the steering bogie 1 of Embodiment 1, and explanations thereof are omitted.

Figure 9:
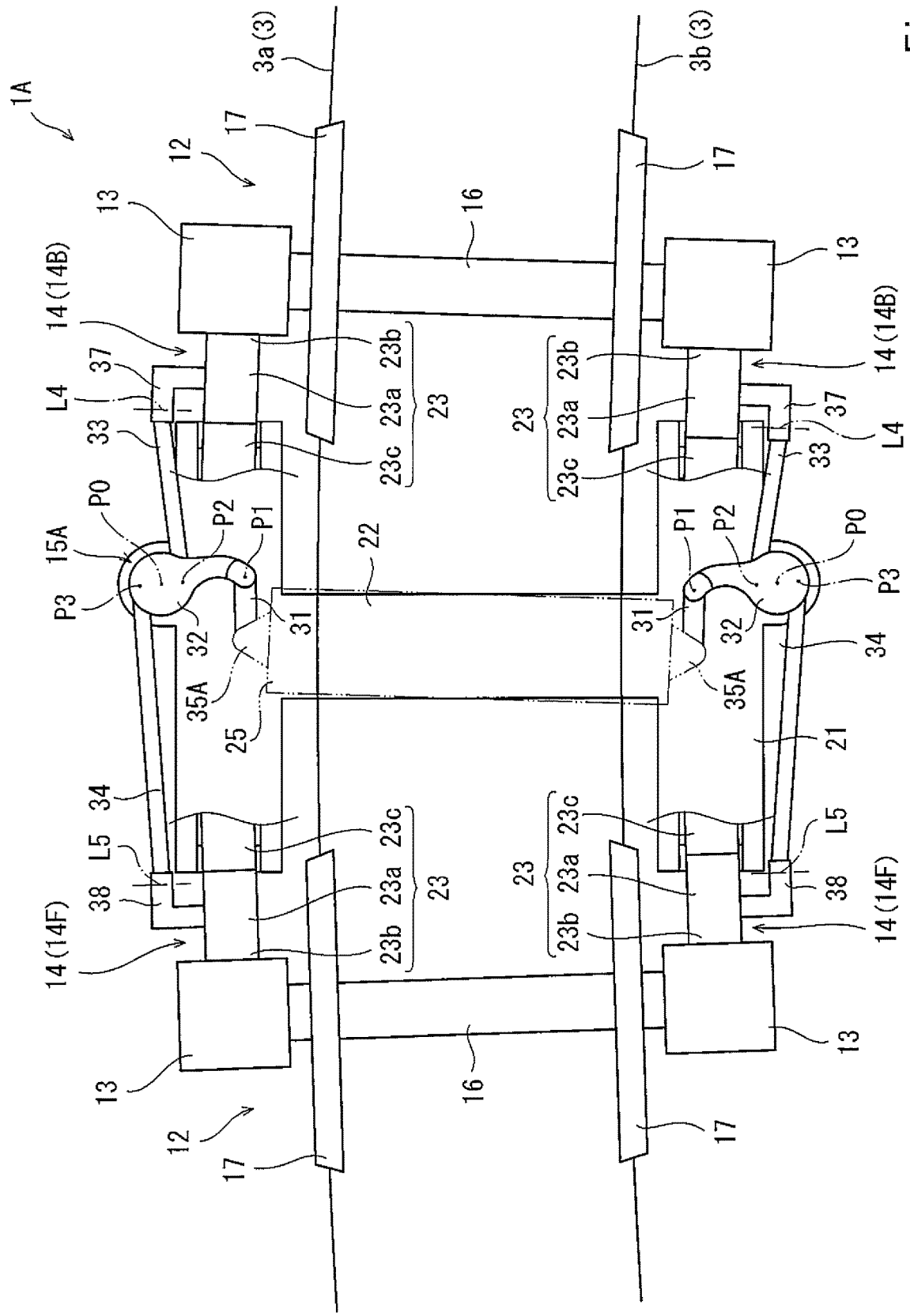
FIG. 9 is a plan view when viewing, from a vehicle upper side, a state where the steering bogie of Embodiment 2 travels through the curved section.

As shown in FIG. 9, the steering bogie 1A of Embodiment 2 includes a pair of steering mechanisms 15A. The steering mechanisms 15A are provided at respective upper surfaces of the side sills 21 such that the fulcrum axis L1 extends in the car upward/downward direction. The steering mechanisms 15A are mirror-symmetrically arranged about the carbody center line. It should be noted that the steering mechanisms 15A are the same in configuration as the steering mechanisms 15 of Embodiment 1, and the coupling link 31 is coupled to a bolster beam-side link receiver 35A of the bolster beam 25. As shown in FIG. 9, each of the steering mechanisms 15A is attached to the bogie frame 11 in such a posture that the coupling point P1, the fulcrum P0, and the action points P2 and P3 are aligned on the same straight line in the car width direction.

In the steering bogie 1A configured as above, since the distances X2 (distance between P0 and P2) and X3 (distance between P0 and P3) of the steering mechanism 15A can be made short, the external dimension of the steering lever 32 can be made small (especially, the height of the steering lever 32 can be suppressed). With this, the width of the steering mechanism 15A can be made small, and the width of the steering bogie 1A can be suppressed. Further, the steering mechanism 15A is formed by stacking plate-shaped members in a direction in which the fulcrum axis L1 extends, and a height of the steering mechanism 15A is smaller than a width of the steering mechanism 15A. Therefore, by attaching the steering mechanism 15A to the bogie frame 11 such that the fulcrum axis L1 extends in the car upward/downward direction, the amount of projection of the steering mechanism 15A projecting from the bogie frame 11 in the car upward/downward direction can be suppressed. With this, the height of the steering bogie 1A can be made low.

Other than the above, the steering bogie 1A has the same operational advantages as the steering bogie 1 of Embodiment 1.

Other Embodiments

Each of the steering bogies 1 and 1A of Embodiments 1 and 2 is a bogie with a bolster, i.e., a bogie including the bolster beam 25. However, each of the steering bogies 1 and 1A does not necessarily have to include the bolster beam 25. To be specific, each of the steering bogies 1 and 1A may be a bolsterless bogie. In this case, the coupling link 31 of each of the steering mechanisms 15 and 15A is turnably coupled to a link receiving member projecting downward from a lower surface of the carbody 4. With this, the coupling link 31 moves toward the first or second side in the longitudinal direction in conjunction with the swing operation of the carbody 4 relative to the bogie frame 11, and thus, the steering mechanism 15, 15A operates. In each of the steering bogies 1 and 1A of Embodiments 1 and 2, both of the front and rear wheelsets 12 are steered by the steering mechanisms 15. However, both of the wheelsets 12 do not necessarily have to be steered. Each of the steering bogies 1 and 1A may be configured such that any one of the front and rear wheelsets 12 is steered by the steering mechanism 15 or 15A.

Figure 10:
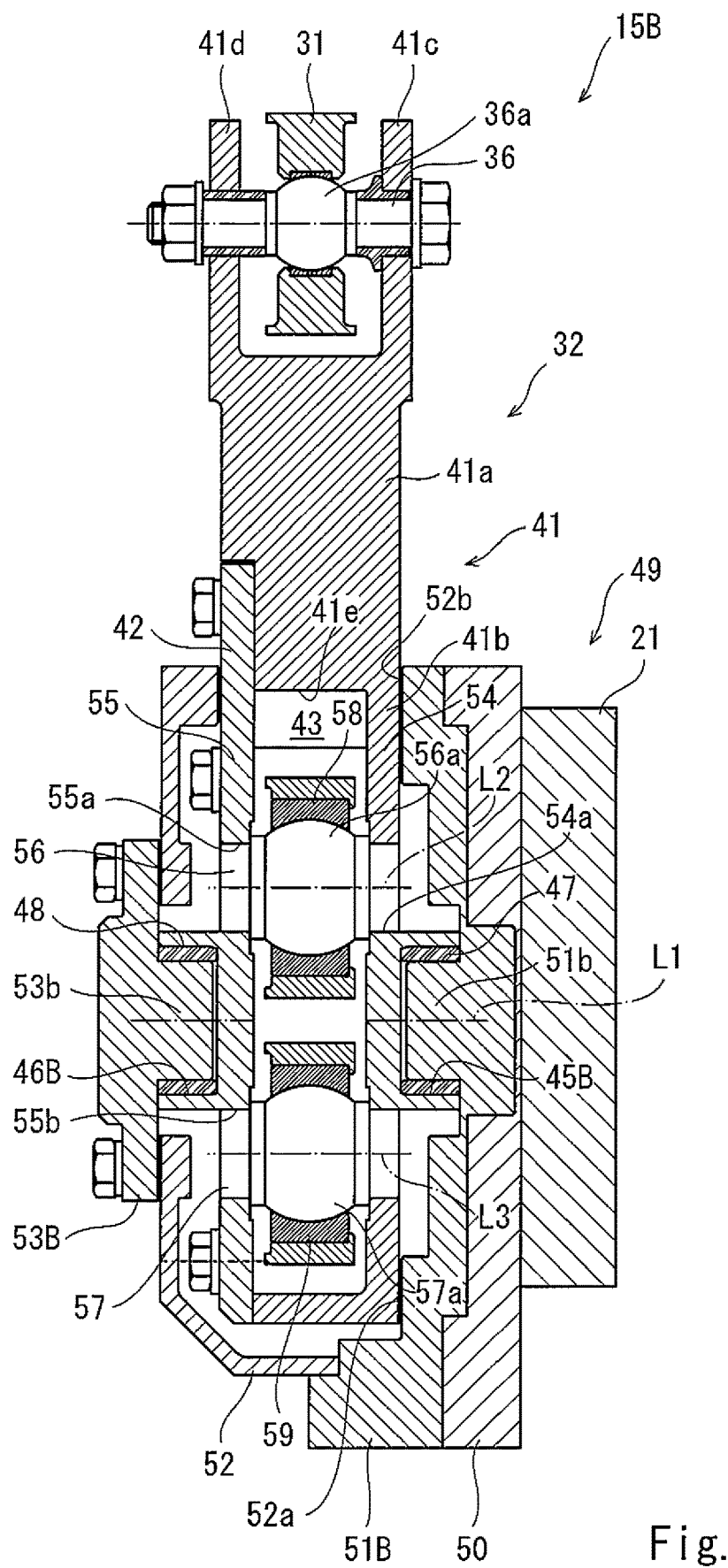
FIG. 10 is a rear sectional view when viewing the steering mechanism of the steering bogie of Other Embodiment from a rear side.

In each of the steering bogies 1 and 1A of Embodiments 1 and 2, the pair of shaft portions 45 and 46 as turning center members are formed at the steering lever 32 of the steering mechanism 15 or 15A. However, the turning center members do not necessarily have to be the pair of shaft portions 45 and 46. For example, as in a steering mechanism 15B shown in FIG. 10, a pair of shaft portions 51b and 53b may be formed at a rear box 51B and a box lid 53B, respectively, and insertion grooves 45B and 46B as the turning center members may be formed at a back surface of the accommodating portion 41b and a front surface of the lid body 42 of the steering lever 32, respectively. By inserting the shaft portions 51b and 53b into the respective insertion grooves 45B and 46B through the respective thrust bushings 47 and 48, the steering mechanism 15B obtains the same operational advantages as each of the steering mechanism 15 of the steering bogie 1 and the steering mechanism 15A of the steering bogie 1A.

In each of the steering bogies 1 and 1A of Embodiments 1 and 2, the shaft portions 45 and 46 are formed at both respective axial direction-side surfaces of the steering lever 32. However, the turning center member (the shaft portion 45 or the insertion groove 45B) may be formed on only one of the axial direction-side surfaces of the steering lever 32.

Further, in each of the steering bogies 1 and 1A of Embodiments 1 and 2, the shaft portions 45 and 46 and the steering links 33 and 34 are arranged so as to overlap one another in a side view. However, at least one of the steering links 33 and 34 may be arranged so as to overlap the shaft portions 45 and 46. Further, even when the steering links 33 and 34 do not overlap the shaft portions 45 and 46, an effect of improving the degree of freedom of the design of the steering links 33 and 34 can be obtained by arranging the shaft portions 45 and 46 offset with respect to the steering links 33 and 34. It should be noted that the bogie 1 may include plate springs instead of the side sills 21 and the axle springs 24. To be specific, the bogie 1 may be configured such that: the spring receiving portions of the pair of front and rear axle boxes 13 support both longitudinal direction end portions of each of the plate springs from below; and longitudinal direction middle portions of the plate springs support the cross beam 22 from below.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST

L1 fulcrum axis
1, 1A steering bogie (railcar steering bogie)
2 railcar
4 carbody
11 bogie frame
12 wheelset
13 axle box
14 axle box suspension
15 steering mechanism
16 axle
17 wheel
23 axle beam
23a axle beam main body portion
23b base end portion
23c axle beam tip end portion
25 bolster beam (bolster)
31 coupling link
32 steering lever
32a, 32b opening
33 first steering link
34 second steering link
45 shaft portion (turning center member)
45B insertion groove portion (turning center member)
46 shaft portion (turning center member)
46B insertion groove portion (turning center member)
54 plate portion
54a, 54b fitting hole
55 plate portion
55a, 55b fitting hole
56 first pin member
56a spherical bushing
57 second pin member
57a spherical bushing
58 self-lubrication rubber member
59 self-lubrication rubber member

The invention claimed is:

1. A railcar steering bogie comprising a bogie frame supporting a carbody or a bolster such that the carbody or the bolster is swingable relative to the bogie frame about a vertical axis;
    two wheelsets each including an axle and a pair of wheels; and a steering mechanism configured to steer at least one of the two wheelsets in accordance with the swinging of the carbody or the bolster relative to the bogie frame,
    the steering mechanism including
        a steering lever configured to turn relative to the bogie frame about a fulcrum axis, a coupling link coupling the steering lever and the carbody or the bolster and configured to operate in conjunction with the swinging of the carbody or the bolster relative to the bogie frame, and a steering link coupled to the steering lever and configured to steer the wheelset in conjunction with the turning of the steering lever,
    the steering link being coupled to the steering lever by a pin member,
    the pin member being fixed to the steering lever so as not to be turnable relative to the steering lever.

2. The railcar steering bogie according to claim 1, wherein:
    the steering lever includes a fitting hole; and
    the pin member has a major axis longer than a minor axis of the fitting hole and is fitted in the fitting hole.

3. The railcar steering bogie according to claim 2, wherein:
    the pin member includes a spherical bushing formed in a partially spherical shape;
    and the steering link is provided at the spherical bushing so as to be swivelable by inserting the spherical bushing into the steering link.

4. The railcar steering bogie according to claim 3, wherein the steering mechanism includes a self-lubrication rubber member externally attached to a surface of the spherical bushing.

5. The railcar steering bogie according to claim 1, wherein:
    the steering lever includes a pair of plates arranged so as to be spaced apart from each other in an axial direction in which the fulcrum axis extends;
    the steering link is arranged between the pair of plates; and the pin member extends in the axial direction, is fixed to the pair of plates so as to extend between the pair of plates and so as not to be turnable relative to the pair of plates, and is inserted into the steering link so as to be turnable.

* * * * *